Sept. 9, 1958 G. W. DIETZ 2,851,139
FRICTION DISC
Filed Aug. 17, 1955
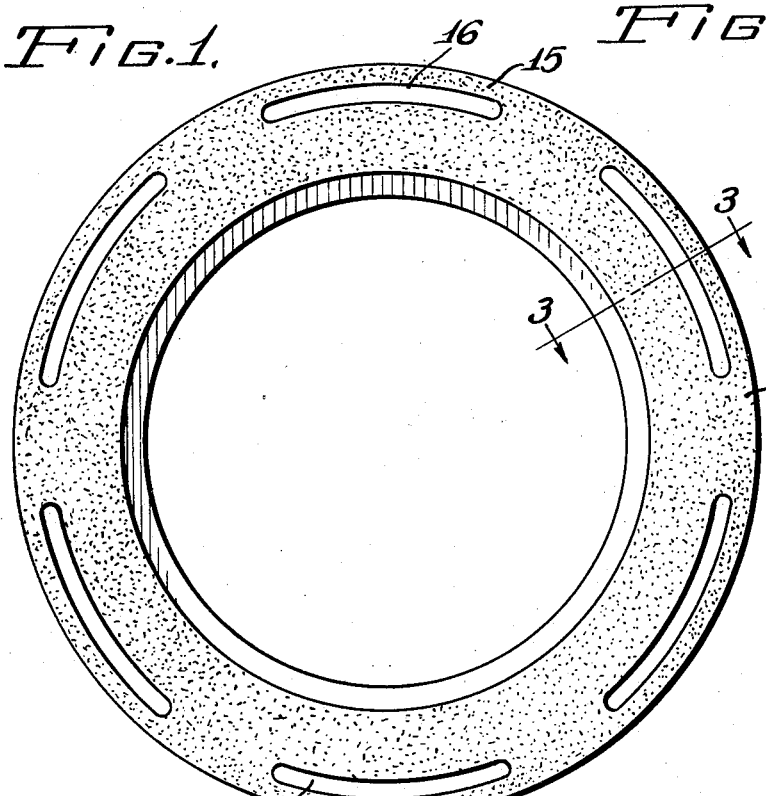
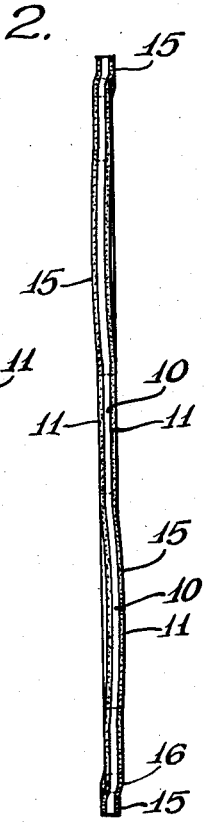
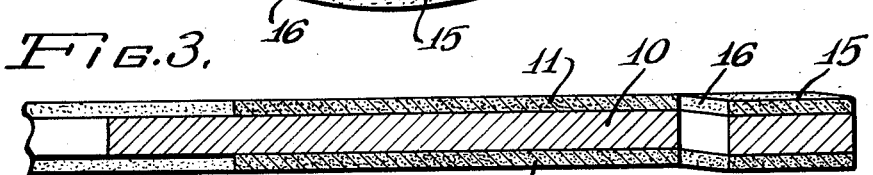
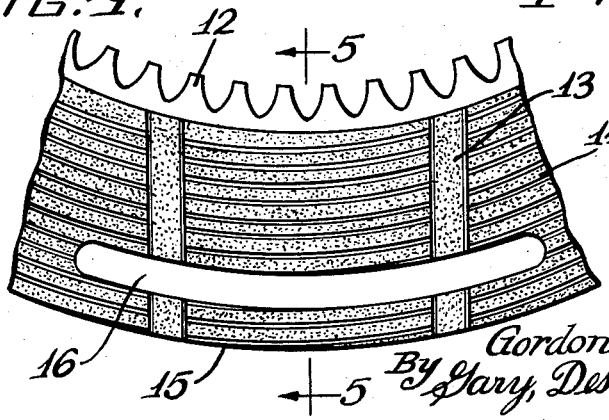
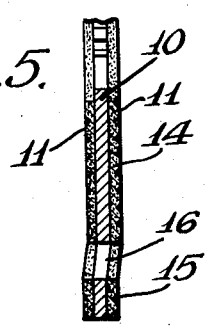
Inventor:
Gordon William Dietz
By Gary, Desmond & Parker
Attys.

2,851,139

FRICTION DISC

Gordon William Dietz, Elmhurst, Ill., assignor to Raybestos-Manhattan, Inc., Passaic, N. J., a corporation of New Jersey Application August 17, 1955, Serial No. 529,005

2 Claims. (Cl. 192—107)

This invention relates to improvements in friction elements of the annular disc type for use as one of the mutually engaging parts in frictional apparatus, and particularly to clutch discs for automotive and industrial equipment where the disc carrying the friction element is compressed between two plane surfaces, one of which may be a driving member, such as a flywheel, and the other a pressure plate.

More specifically, the present invention relates to improvements in clutch plates composed of an annular solid metal disc surfaced on its opposed faces with sintered powdered metal composition, and adapted to operate in a bath of oil. For most efficient life and operation it is essential that there be substantially no out-of-parallelism of the surfaces of the friction disc with reference to the cooperating mating solid metal surfaces and that warping during use be held to a minimum. By reason of the closely machined surfaces employed, the porous character of the sintered metal friction surfaces, and the surface tension of the oil in which the parts operate, it has been found that upon release of the clutch, the respective mutually engaging surfaces of the friction apparatus do not readily or promptly separate, but rather have a tendency to adhere.

It is an object of the present invention to provide friction discs of the class described with novel means for effecting ready and prompt self-separation thereof from previous pressure engagement with a cooperating solid metal surfaced component in response to clutch release or disengagement means.

Other objects and advantages of the present invention, together with its details of construction, will be apparent from a consideration of the following specification and accompanying drawings, wherein:

Fig. 1 is a face view of a friction disc embodying the improvements of the present invention.

Fig. 2 is a side or edge view of the friction disc of Fig. 1.

Fig. 3 is an enlarged fragmentary sectional view on the line 3—3 of Fig. 1.

Fig. 4 is a fragmentary face view of the friction disc of Fig. 1, with added details.

Fig. 5 is a section on the line 5—5 of Fig. 4.

Referring to the drawings, the reference numeral 10 indicates an annular solid metal disc surfaced on each of its opposed faces with a layer of sintered powdered metal composition 11. Powdered metal compositions per se, and methods of bonding and sintering them to metal backing or supporting members for use as friction elements, are well known to the art. Thus, by way of illustration and not limitation, the powdered metal composition may comprise 60–70% copper; 10–25% of other metals such as iron, lead and tin; and 5 to 25% of solid nonmetallic powdered friction modifying materials such as graphite, silica, ceramics, etc. As is also known, this powdered composition is first cold-pressed in a mold at pressures such as 10,000 to 30,000 pounds per square inch to form annular wafers or pre-forms, and then after removal from the press, these pre-forms are sintered in a protective or reducing atmosphere at a temperature of about 1200–1500° F. at a relatively low pressure, such as 50–500 pounds per square inch. Subsequently, or at the same time that sintering is conducted, the powdered metal wafer may be applied to the faces of the solid metal, i. e. steel disc 10, and integrally welded thereto.

The sintered powdered metal surfaced clutch friction disc may be further formed with peripheral gear teeth or splines, such as for example the inner periphery splines 12 shown in Fig. 5, and the radial and helical surface grooves 13 and 14, respectively, conventional in oil clutch practice. As previously indicated, the clutch friction discs of the present invention are adapted to be compressed by the clutch pressure plate, and one or more clutch friction discs may be employed in, for example, the well known multiple disc arrangement, a typical example comprising a pair of driven discs constructed as illustrated herein with a solid metal driving disc disposed between them and the assembly adapted to be compressed in operation between a drive member of a motor vehicle and the spring-actuated compression disc of the clutch. The construction of such clutches and the indicated components thereof, being well known, are not illustrated.

For the purpose of providing prompt response to desired disengagement of the clutch and prompt separation of the respective driven and driving surfaces from frictional engagement, I provide the clutch friction discs of the present invention with springlike means normally projecting transversely to the general plane of the disc. These spring means are formed by the arcuate, circumferentially spaced strips 15, six of which are shown in Fig. 1, in the form of three diametrically opposed pairs, each adjacent strip 15 being bent or bowed in an opposite direction, as shown in Fig. 2. These spring strips 15 are integral with the body of the clutch disc and defined therefrom by the slots 16 or, in lieu of such slots, by means of slits, not shown, such slots or slits being suitably milled into the unit adjacent the outer periphery and parallel thereto. Thereafter the portions 15 are bowed in a direction transverse to the general plane of the disc, so that they project to a slight degree, such as about .015 to about .030 inch beyond hte plane of the face of the disc, in the case of a disc having a diameter of 17.5 inches and an over-all thickness of .275 inch and wherein the sintered powdered metal layers are each about 1/16-inch thick.

For structural purposes and balance the disc should have at least two and preferably at least four spring strips 15, equally spaced, or any greater even number. In the form illustrated, the six strips 15 are each of about 38° arc in length with 22° space between them, the deflection or bowing of the strips being accomplished after formation of the slots 16 by suitable means which permanently elongates the metal strip to the approximate indicated degree.

I have found, however, that even though these spring strips 15, during use, can be successively compressed so that they become coplanar with the disc body under the force of the clutch compression members in use and then spring outwardly on release of the clutch to separate themselves from the adjacent solid metal members, they tend to retain their initially stretched or distorted position, resisting return through repeated use. I further found that even though the metal has been so stretched or distorted, it can, by reason of apparent elasticity, be compressed to within the confines of the planes of the original or remaining major disc surfaces so that smooth and efficient operation, without undue or localized wear, is obtained.

The operation of the clutch is thus rendered positive and instantaneously responsive without lag, and with smooth engagement and disengagement. I have further found that unexpectedly there is an enhanced freedom from tendency to warp during repeated use as compared to similar clutch discs without my unitary spring strips.

Although I have described and illustrated my invention with respect to sintered powdered metal friction facings, it should be understood that the advantages of my structure are applicable to the employment of facings of other compositions, such as of organic materials; for example, combinations of asbestos and hardened organic binder, well known in the art, bonded to a metal supporting disc which can be slotted or slit and bowed transversely of the general plane of the disc for the purposes and advantages described.

I claim:

1. An annular friction disc adapted for use as a clutch plate to be compressed between two plane surfaces in operational engagement in a body of oil, said disc comprising a solid metal supporting plate carrying porous sintered powdered metal friction facings fully bonded to the opposed surfaces thereof, said disc including a plurality of diametrically opposed pairs of arcuate, spaced, narrow peripheral edge portions lying on a single circumferential path partially severed from the disc body in a direction concentric therewith and completely through the supporting plate and friction facings but still integrally joined to said disc body at each end, and each circumferentially adjacent one of said portions being normally alternately bowed in a direction transverse to the plane of said disc, said bowed portions being resiliently compressible to coplanar relationship with said disc in said operational engagement and adapted to effect ready and prompt self-separation thereof in response to clutch release or disengagement means.

2. A friction member comprising an annular metal disc carrying friction composition facings fully bonded to the opposed surfaces thereof, said disc including a pluraltiy of diametrically opposed pairs of arcuate, spaced, narrow peripheral edge portions lying in a single circumferential path partially severed from the disc body in a direction concentric therewith and completely severed through the supporting plate and friction facings but still integrally joined to said disc body at each end, each circumferentially adjacent one of said portions being normally alternately bowed in a direction transverse to the plane of said disc for effecting ready and prompt self-separation thereof from previous pressure engagement with a cooperating surface in response to clutch release or disengagement means.

References Cited in the file of this patent

UNITED STATES PATENTS

| 1,492,862 | Smith | May 6, 1924 |
| 1,727,841 | Raviolo | Sept. 10, 1929 |
| 1,810,360 | Loeffler | June 16, 1931 |
| 2,175,418 | Wales | Oct. 10, 1939 |
| 2,733,798 | Almen et al. | Feb. 7, 1956 |

FOREIGN PATENTS

| 575,996 | Great Britain | Mar. 14, 1946 |